United States Patent
Sauter et al.

(12)

(10) Patent No.: US 10,414,447 B2
(45) Date of Patent: Sep. 17, 2019

(54) VOLUME EXPANSION ASSEMBLY FOR PICKUP TRUCK BOX

(71) Applicant: Ford Global Technologies, LLC, Dearborn, MI (US)

(72) Inventors: Erin Elizabeth Sauter, Oak Park, MI (US); Ria Sinha McClellan, Dearborn, MI (US); Michael William Danyo, Trenton, MI (US); Joshua Robert Hemphill, White Lake, MI (US); Mark Sauter, West Chester, OH (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 24 days.

(21) Appl. No.: 15/729,721

(22) Filed: Oct. 11, 2017

(65) Prior Publication Data

US 2019/0106161 A1    Apr. 11, 2019

(51) Int. Cl.
*B62C 1/04* (2006.01)
*B62D 33/027* (2006.01)
*B62D 33/037* (2006.01)

(52) U.S. Cl.
CPC ..... *B62D 33/0276* (2013.01); *B62D 33/0273* (2013.01); *B62D 33/037* (2013.01)

(58) Field of Classification Search
CPC .......................... B62D 33/0276; B62D 33/037
See application file for complete search history.

(56) References Cited

U.S. PATENT DOCUMENTS

| | | |
|---|---|---|
| 4,531,775 A | 7/1985 | Beals |
| 6,254,169 B1 | 7/2001 | Arthur |
| 6,340,195 B1 | 1/2002 | Hall et al. |
| 6,607,229 B1 | 8/2003 | McIntosh |
| 6,634,689 B1 | 10/2003 | Soto |
| 7,735,898 B1 | 6/2010 | Bridges |
| 9,540,050 B2 | 1/2017 | Miller |
| 2017/0361756 A1* | 12/2017 | Marchlewski ..... B62D 33/0207 |

* cited by examiner

*Primary Examiner* — Lori L Lyjak
(74) *Attorney, Agent, or Firm* — Vichit Chea; Brooks Kushman P.C.

(57) ABSTRACT

A truck box assembly including a sidewall, a pair of doors, and a support assembly is provided. The sidewall may define an opening to provide clearance for a wheel house. Each of the pair of doors extends from one side of the opening. The support assembly may be mounted to a truck box and support the sidewall as the sidewall moves between retracted and expanded positions. Each of the doors may be moveable between an open position and a closed position filling the opening in the expanded position. The support assembly may include a mount post secured to the truck box at a standard interface plate (SIP) bracket and a horizontal member extending from the mount post and secured to the truck box at a stake pocket hole.

20 Claims, 9 Drawing Sheets

VOLUME EXPANSION ASSEMBLY FOR PICKUP TRUCK BOX

TECHNICAL FIELD

This disclosure relates to assemblies for expanding a cargo volume of pickup truck boxes.

BACKGROUND

Pickup trucks are motor vehicles with a front passenger area, often referred to as a cab, and an open top rear cargo area, often referred to as a truck box. The truck box usually has a substantially flat bed from which two side body sidewalls and a forward interconnecting header extend upwardly from the bed. A bottom hinged door, commonly referred to as a tailgate, hinged at the rear edge of the bed and closable provides a fourth wall for the cargo area. Cabs and truck boxes may be separate assemblies or part of the same unibody structure. Pickup trucks are popular largely because the truck box allows them to be utilized in many different ways, including carrying a variety of types of cargo based on available truck box stowage volume.

This disclosure is directed to solving the above problems and other problems as summarized below.

SUMMARY

According to an aspect of the present disclosure, a truck box assembly includes a sidewall, a pair of doors, and a support assembly. The sidewall defines an opening to provide clearance for a wheel house. Each of the pair of doors extends from one side of the opening. The support assembly is mounted to a truck box and supports the sidewall as the sidewall moves between retracted and expanded positions. Each of the doors is moveable between an open position and a closed position filling the opening in the expanded position. The support assembly may include a first mount post positioned rearward of the wheel house and a second mount post positioned forward of the wheel house. The sidewall may be mounted to each of the first mount post and the second mount post for vertical translation. The support assembly may include a mount post secured to the truck box at a standard interface plate (SIP) bracket and a horizontal member extending from the mount post and secured to the truck box at a stake pocket hole. The support assembly may further include a fastener assembly having an overhang for hooking over the SIP bracket and a pin extending from the horizontal member sized for insertion within the stake pocket hole. The assembly may further include a second support assembly, a rear support assembly, and a forward support assembly. The second support assembly may be mounted to the truck box and support a second sidewall for vertical translation between a second retracted position and a second expanded position. The rear support assembly may be mounted to a tailgate of the truck box and support a rear sidewall for vertical translation between a third retracted position and a third expanded position. The forward support assembly may be mounted to a header of the truck box and support a forward sidewall for vertical translation between a fourth retracted position and a fourth expanded position. The sidewalls may define a square-shaped wall extending from an upper portion of the truck box when vertically translated to respective expanded positions to increase a cargo volume of the truck box. The rear support assembly may have a clamp extending from a body member. The clamp may be sized for grasping an upper portion of a tailgate or header and the body member may include a slot sized to receive a flange of a rear sidewall or forward sidewall to facilitate vertical translation along the body member. The support assembly may include a translation post sized for vertical translation within a mount post for securing to a SIP bracket. The sidewall may be secured to the translation post to move between the retracted and expanded positions.

According to another aspect of the present disclosure, a pickup truck box expansion assembly includes a support assembly, a sidewall, and a pair of doors. The support assembly includes a vertical member having a fastener assembly for securing to a SIP bracket of a truck box, a horizontal member extending rearward from an upper portion of the vertical member and having a pin for securing within a stake pocket hole of the truck box, and a translation assembly mounted to the vertical member for translation between a retracted and an expanded position. The sidewall is mounted to the translation assembly and includes a cutout sized for providing clearance to a wheel house when the translation assembly is in the retracted position. Each of the pair of doors is mounted to one of two opposing sides of the cutout to horizontally pivot and fill the cutout when the translation assembly is in the expanded position. The SIP bracket may be located rearward of the wheel house and adjacent the stake pocket hole. The SIP bracket may include a raised portion spaced from an inner surface of the truck box. The fastener assembly may include an overhang sized for disposal between the raised portion and the inner surface to mount the vertical member to the SIP bracket. The SIP bracket may include a SIP slot, and the fastener assembly may include a SIP pin sized for insertion within the SIP slot to mount the vertical member to the SIP bracket. The assembly may further include a rear support assembly including a clamp extending from a body member. The clamp may be sized for grasping an upper portion of a tailgate or header of the truck box and the body member may include a slot sized to receive a flange of a rear sidewall or a forward sidewall to facilitate vertical translation along the body member. The assembly may further include a second sidewall, a second pair of doors, a rear sidewall, and a forward sidewall. The second sidewall may be mounted to a second translation assembly and include a second cutout sized for providing clearance to a second wheel house when the second translation assembly is in a second retracted position. Each of the second pair of doors may be mounted to one of each side of the second cutout to horizontally pivot and fill the second cutout when the second translation assembly is in a second expanded position. The rear sidewall may be mounted to a tailgate of the truck box for vertical translation between a third retracted position and a third expanded position. The forward sidewall may be mounted to a header of the truck box for vertical translation between a fourth retracted position and a fourth expanded position. The sidewalls may be arranged with one another when oriented in respective expanded positions to define an expanded cavity having a volume greater than a volume of a truck box cavity when the sidewalls are oriented in respective retracted positions. A lock mechanism may be located at one or more corners between adjacent sidewalls. One of the adjacent sidewalls may include a first loop overlapping a second loop of the other of the adjacent sidewalls. The lock mechanism may further include a pin for disposal within the first loop and the second loop to structurally reinforce the sidewalls when oriented in the raised position. The translation assembly may include a translation member sized for telescopic vertical translation within the vertical member to move the sidewall between the retracted and expanded positions.

According to a further aspect of the present disclosure, a pickup truck box assembly a truck box and an expansion assembly. The truck box includes a first body sidewall, a second body sidewall, a tailgate, and a header. The expansion assembly is moveable between a lowered position and a raised position. The expansion assembly includes a first sidewall mounted to the first body sidewall, a second sidewall mounted to the second body sidewall, a rear sidewall mounted to the tailgate, and a forward sidewall mounted to the header. The sidewalls are arranged with one another to define a first cargo volume of the truck box when oriented in respective lowered positions and a second cargo volume greater than the first cargo volume when the sidewalls are oriented in respective raised positions. The pickup truck box assembly may further include a pair of support assemblies each to support one of the first body sidewall and the second body sidewall. Each of the pair of support assemblies may include a vertical member and a horizontal member. The vertical member may have a fastener assembly to secure the vertical member to a SIP bracket of the truck box and may have a slot to receive a translation flange of the respective sidewall to facilitate vertical translation of the respective sidewall. The horizontal member may extend from an upper portion of the vertical member to secure to a stake pocket hole of the truck box. The SIP bracket may include a raised portion spaced from a surface of a respective body sidewall of the truck box. The fastener assembly may include an overhang sized for disposal between the raised portion and the surface to secure the vertical member to the SIP bracket. The pickup truck box assembly may include a first hinge and a second hinge. The first hinge may be disposed between the first sidewall and the first body sidewall to facilitate pivoting of the first sidewall between the retracted position and the expanded position. The second hinge may be disposed between the second sidewall and the second body sidewall to facilitate pivoting the second sidewall between the lowered position and the raised position. The pickup truck box assembly may further include a support member secured to one of the first sidewall and the second sidewall at a first end and include a second end sized for disposal within a stake pocket hole of one of the first sidewall and the second sidewall. A lock mechanism may be included at each corner between adjacent sidewalls including a first loop overlapping a second loop and a pin for disposal within the first loop and the second loop to structurally reinforce the sidewalls when oriented in the raised position.

The above aspects of the disclosure and other aspects will be apparent to one of ordinary skill in the art in view of the attached drawings and the following detailed description of the illustrated embodiments.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
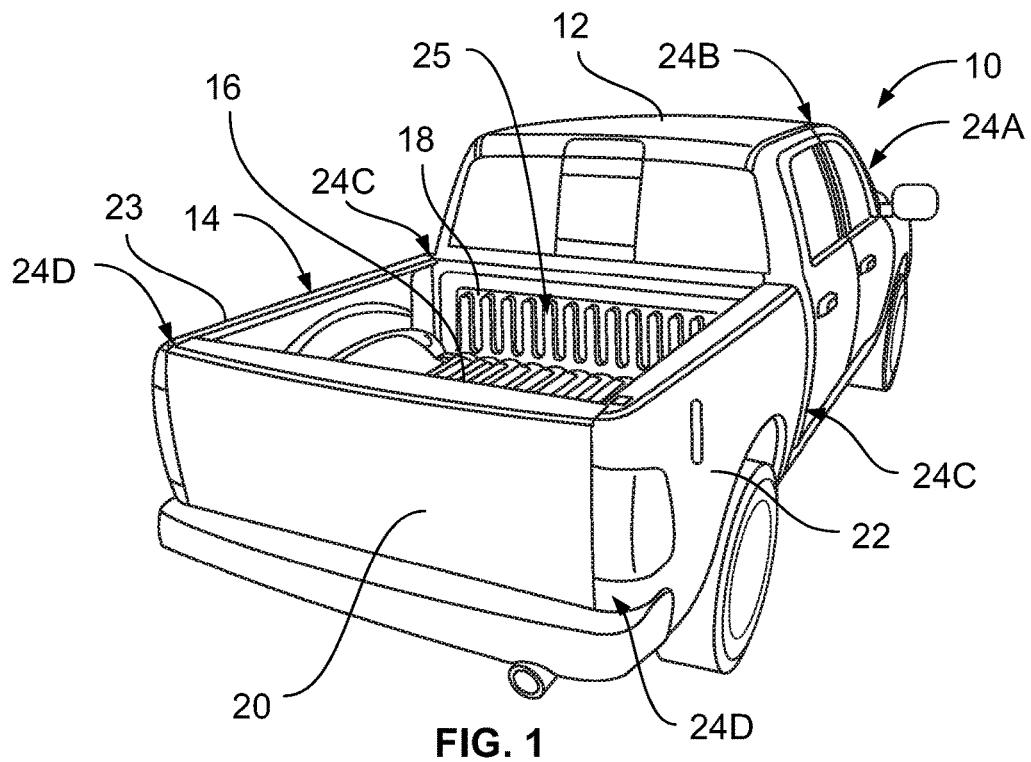
FIG. 1 is a rear perspective view of an example of a portion of a pickup truck.

FIG. 1 illustrates an example of a vehicle 10 that includes a cabin 12 and a truck box 14 supported by a vehicle chassis (not shown). The truck box 14 includes a bed 16 having a forward end adjacent to the cabin 12 and a rear end opposite the forward end. The bed 16 supports a header 18 at the forward end and a tailgate 20 at the rear end. The tailgate 20 is pivotally mounted to the bed 16. The bed 16 supports a first body sidewall 22 and a second body sidewall 23. The header 18, the tailgate 20, the first body sidewall 22, and the second body sidewall 23 define a first truck box volume 25 therebetween. In this example, the vehicle 10 includes an A-pillar region 24A, a B-pillar region 24B, a C-pillar region 24C, and a D-pillar region 24D. The vehicle 10 is a four-door configuration, however other configurations, such as a two-door configuration, may be adapted to incorporate the disclosed concepts. Alternate configurations may include different pillar region references than the vehicle 10.

The first body sidewall 22 and second body sidewall 23 are secured to the header 18 at respective regions referred to as forward box pillar regions of the truck box 14 or the C-pillar regions 24C. The tailgate 20 pivots between an open position and a closed position. In the closed position as shown in FIG. 1, each lateral end of the tailgate 20 may be removably attached to the first body sidewall 22 and the second body sidewall 23 at respective regions referred to as rear box pillar regions or the D-pillar regions 24D herein.

Figure 2:
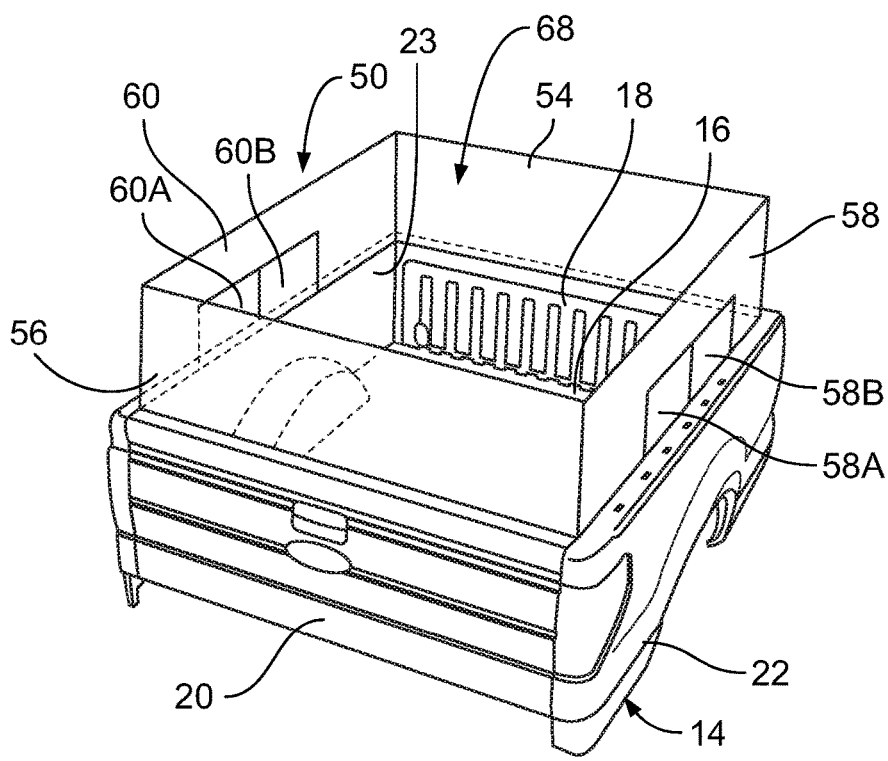
FIG. 2 is a perspective view of example of a pickup truck box illustrating an example of an expansion assembly mounted thereto.

FIG. 2 illustrates the truck box 14 of FIG. 1 with an example of a truck box expansion assembly 50 mounted thereto. The truck box expansion assembly 50 includes a forward sidewall 54, a rear sidewall 56, a first sidewall 58, and a second sidewall 60. The first sidewall 58 includes moveable doors 58A and 58B mounted at hinges 59A and 59B, respectively. The second sidewall 60 includes moveable doors 60A and 60B. The truck box expansion assembly defines a second truck box volume 68 when in an expanded position that is greater than the first truck box volume 25. In one example, the second truck box volume 68 defines a volume twice that of the first tuck box volume 25.

Figure 3:
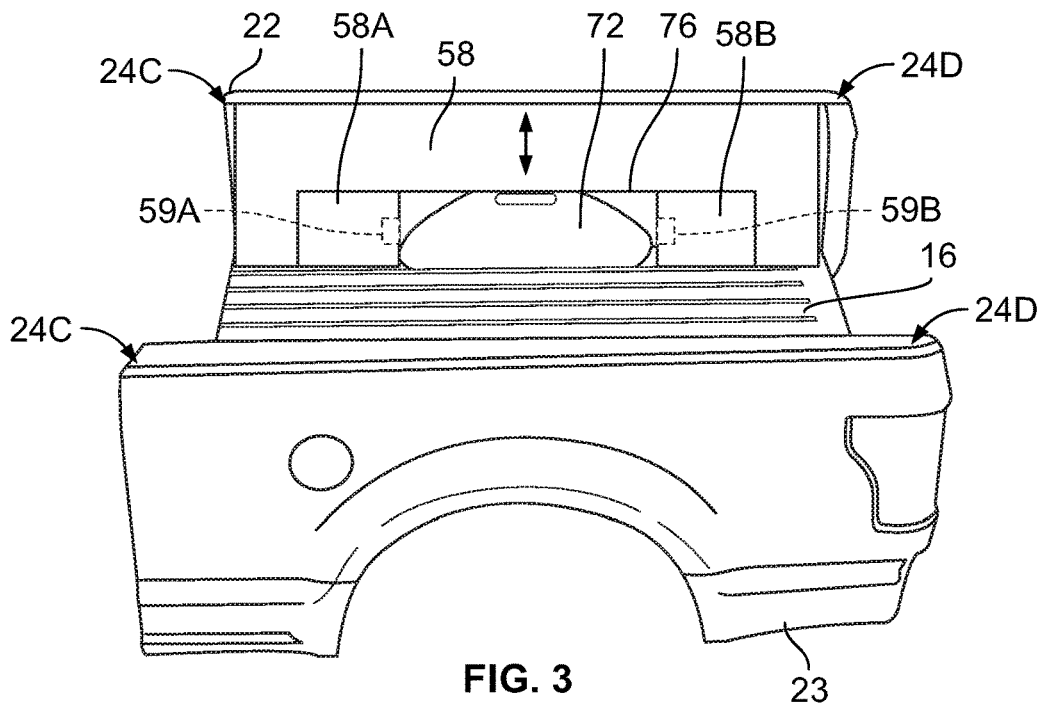
FIG. 3 is a side perspective view of a portion of the pickup truck box of FIG. 2 illustrating an example of a portion of the expansion assembly of FIG. 2 shown in a first position.

FIG. 3 illustrates an example of the first sidewall 58 of the truck box expansion assembly 50 in a retracted position which may be referred to as a first position. In the first position, each of the first sidewall 58 and the second sidewall 60 is retracted inboard of one of the first body sidewall 22 and the second body sidewall 23. The first sidewall 58 and the second sidewall 60 may be arranged with respective body sidewalls to retract within the truck box 14. Each of the moveable door 58A and the moveable door 58B are oriented relative to the first sidewall 58 to provide clearance for a wheel house 72 in the first position. For example, the first body sidewall 22 defines an opening 76 sized to accommodate the wheel house 72. While not visible in FIG. 3, the second body sidewall 23 may define an opening similar to the opening 76 sized to accommodate a wheel house opposite the wheel house 72.

Figure 4:
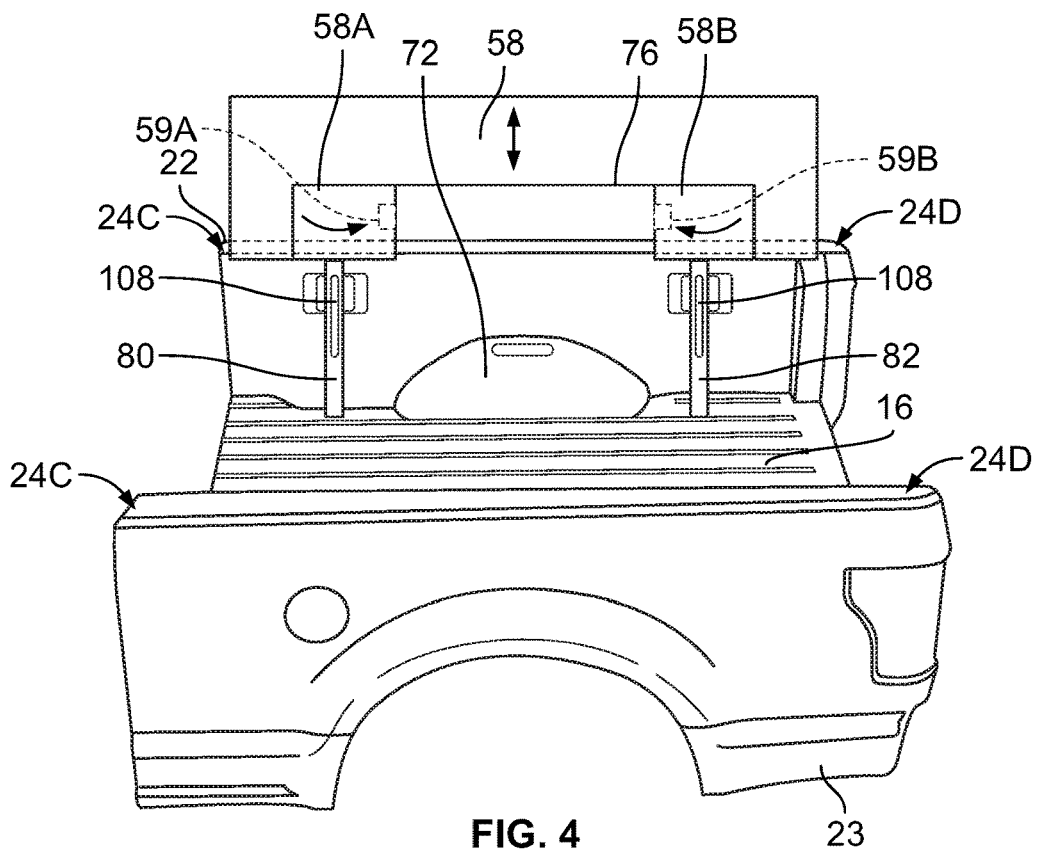
FIG. 4 is a side perspective view of a portion of the pickup truck box of FIG. 2 illustrating a portion of the expansion assembly of FIG. 2 shown in a second position with pivotable doors opened to provide access to the truck bed through an opening.

FIG. 4 illustrates the first sidewall 58 of the truck box expansion assembly 50 in the expanded position sometimes referred to as a second position. For example, the first sidewall 58 may translate vertically relative to the bed 16 along a first mount post 80 and a second mount post 82. The first mount post 80 and the second mount post 82 may be secured to the truck box 14 by various assemblies as further described below. While not visible in FIG. 4, the second sidewall 60 may be mounted to the truck box 14 in a similar fashion to facilitate translation of the second sidewall 60 between retracted and expanded positions. In FIG. 4, the moveable door 58A and the moveable door 58B are shown in the open position.

Figure 5:
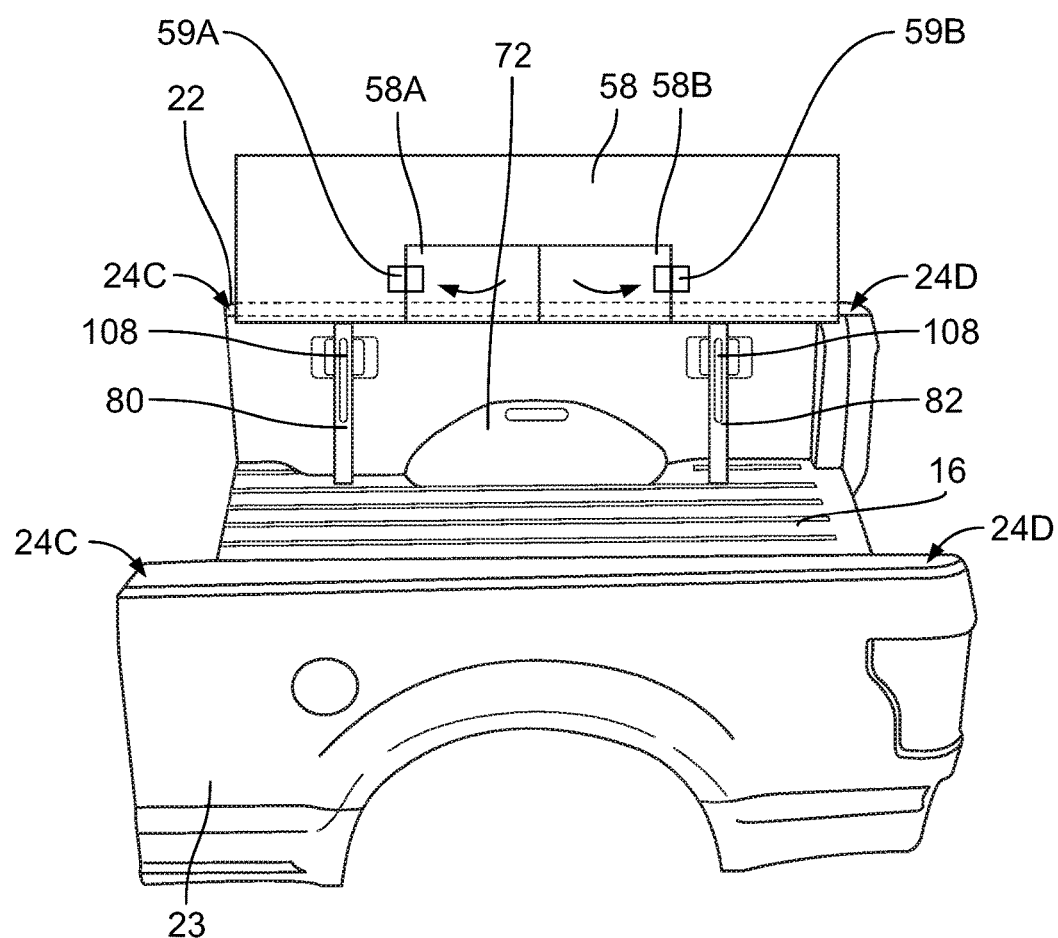
FIG. 5 is a side perspective view of a portion of the pickup truck box of FIG. 2 illustrating a portion of the expansion assembly of FIG. 2 shown in a second position with the pivotable doors closed.

FIG. 5 illustrates the first sidewall 58 of the truck box expansion assembly 50 in the expanded position with each of the moveable door 58A and the moveable door 58B pivoted to close the opening 76. Each of the moveable door 58A and the moveable door 58B may be mounted to the first sidewall 58 via the hinge 59A and the hinge 59B to facilitate pivotal movement between the position in which clearance is provided for the wheel house 72 and the position in which the opening 76 is closed.

Figure 6:
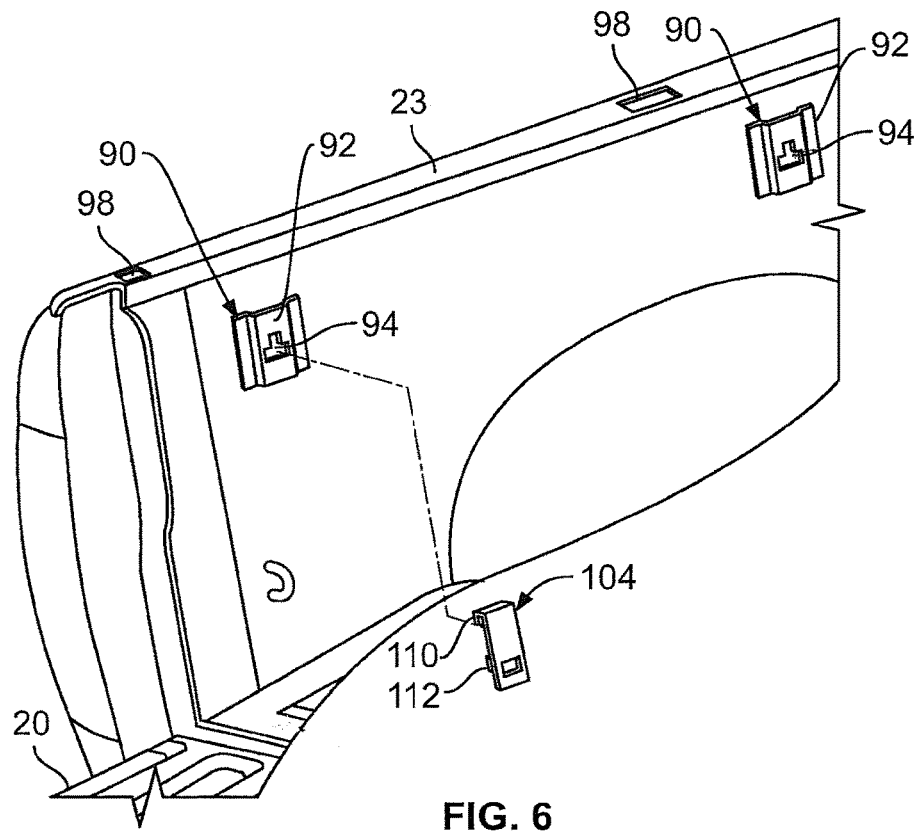
FIG. 6 is a rear fragmentary perspective view of a sidewall of the pickup truck box of FIG. 2.

FIG. 6 illustrates an example of a pair of standard interface plate (SIP) brackets mounted to the truck box 14 to assist in facilitating translation of the first sidewall 58 and the second sidewall 60. Each of a pair of SIP brackets 90 may be mounted to each of the first body sidewall 22 and the second body sidewall 23. Each of the pair of SIP brackets 90 may include a raised portion 92 spaced from a surface of a respective body sidewall. Each of the raised portions 92 may include a SIP slot 94. Each of the pair of SIP brackets 90 may be mounted to the second body sidewall 23 in a location adjacent a stake pocket hole 98. Each of the pair of SIP brackets 90 are adapted to receive a clip, such as a clip from a mount assembly.

Figure 7A:
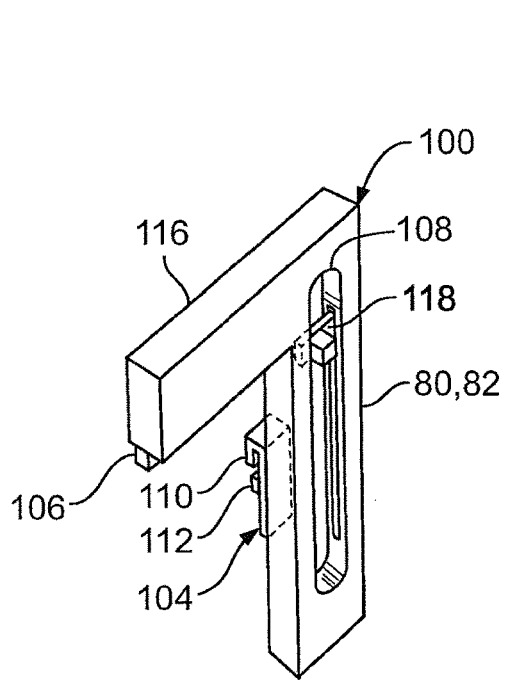
FIG. 7A is a perspective view of an example of a portion of a mount assembly for a sidewall of the expansion assembly of FIG. 2.

FIG. 7A illustrates an example of a portion of a mount assembly for attaching one of the sidewalls to the truck box 14. In this example, the mount assembly 100 is attached to the SIP bracket 90, however the mount assembly 100 may be secured directly to the truck box 14. The mount assembly 100 may include one of the first mount post 80 or the second mount post 82, a SIP clip 104, a stake pocket pin 106, and a translation slot 108. Two mount assemblies 100 may be attached to the truck box 14 to assist in facilitating translation of a sidewall of the truck box expansion assembly 50. The SIP clip 104 may include an overhang 110 and a SIP pin 112 (shown in FIG. 6). The overhang 110 is oriented to be hooked over a top edge of one of the pair of SIP brackets 90. The SIP pin 112 may be inserted within the SIP slot 94. The stake pocket pin 106 may be arranged upon a horizontal member 116 of the mount assembly 100 and may be inserted within the stake pocket hole 98 when the SIP clip 104 is mounted to the SIP bracket 90. The horizontal member 116 may be shaped to rest upon an upper portion of the truck box 14. The translation slot 108 may extend along either the first mount post 80 or the second mount post 82. The translation slot 108 may receive a flange 118 of one of the first sidewall 58 or the second sidewall 60. The flange 118 may move along the translation slot 108 to vertically translate the sidewalls between the retracted and expanded positions.

Figure 7B:
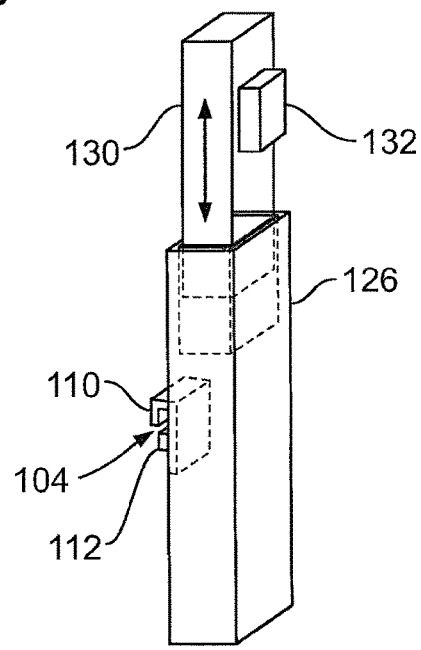
FIG. 7B is a perspective view of another example of a portion of a mount assembly for a sidewall of the expansion assembly of FIG. 2.

FIG. 7B illustrates another example of a portion of a mount assembly to assist in expanding the cargo volume of the truck box 14. In this example, a telescopic feature is utilized to vertically translate a sidewall between retracted and expanded positions. A support post 126 may be secured to the SIP bracket 90 as described above regarding the mount assembly 100. Alternatively, the support post 126 may be secured directly to the truck box 14. The support post 126 may include the SIP clip 104 having the overhang 110 and the SIP pin 112 for securing the support post 126 to the SIP bracket 90. A translation post 130 may be mounted to the support post 126 for vertical translation. For example, the support post 126 and the translation post 130 may have a telescopic relationship with one another. The translation post 130 may be sized to translate vertically within the support post 126. A sidewall, similar to the first sidewall 58 described above, may be secured to the translation post 130 at a mount flange 132 to vertically translate with the translation post 130 between retracted and expanded positions.

Figure 8A:
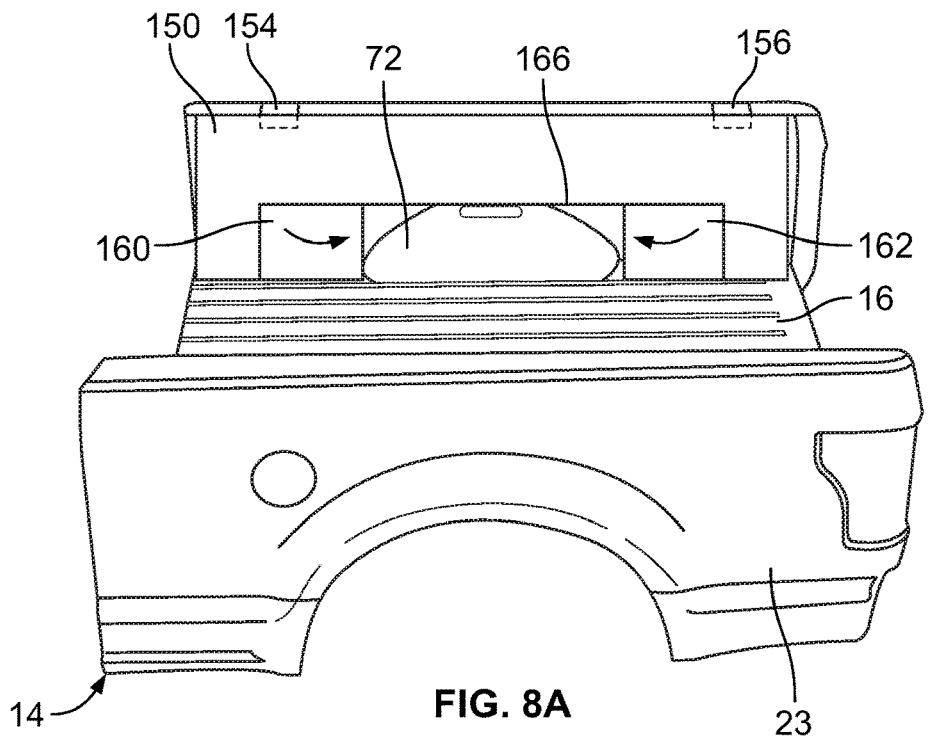
FIG. 8A is a side perspective view of a portion of the pickup truck box of FIG. 2 illustrating another example of a portion of the expansion assembly of FIG. 2 shown in a first position.
Figure 8B:
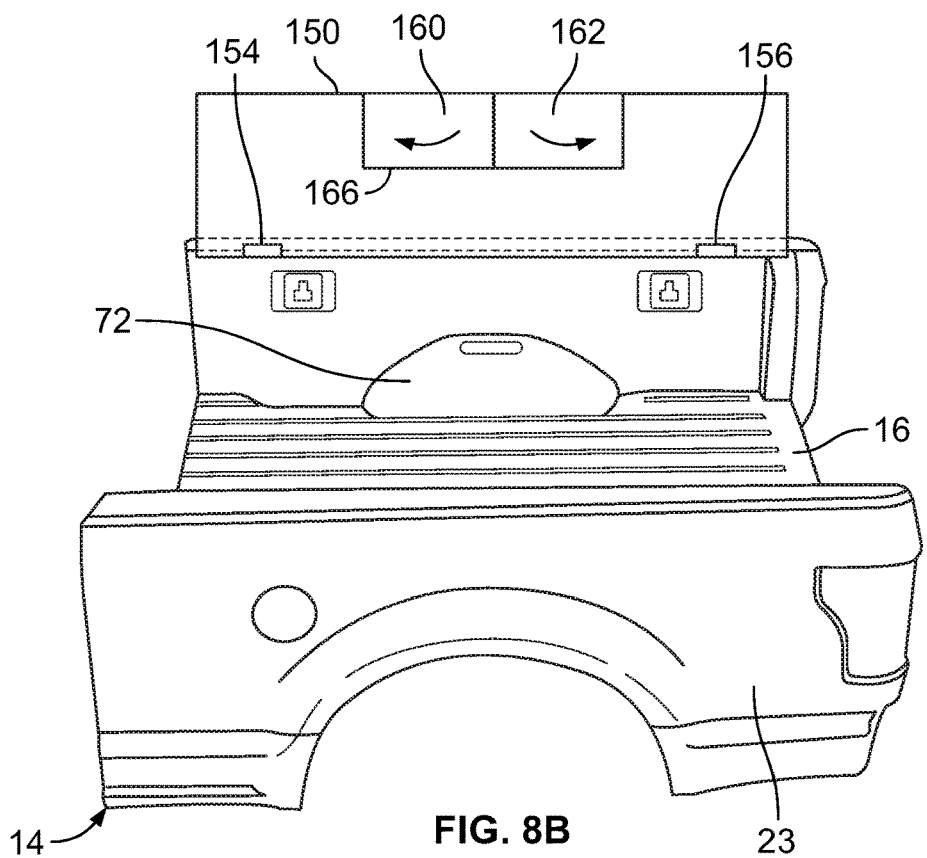
FIG. 8B is a side perspective view of a portion of the pickup truck box of FIG. 2 illustrating the portion of the expansion assembly of FIG. 8 shown in a second position.

FIGS. 8A and 8B illustrate another example of a sidewall and mount assembly to assist in expanding the cargo volume of the truck box 14. In this example, a first sidewall 150 is mounted to the truck box 14 via a first hinge 154 and a second hinge 156. While shown as two separate hinges, it is contemplated that an embodiment in which a single hinge extends along an edge of the truck box 14 to mount the first sidewall 150 to the truck box 14 is within a scope of this disclosure. The first sidewall 150 may include a first pivot panel 160 and a second pivot panel 162. Each of the first pivot panel 160 and the second pivot panel 162 may be mounted for pivotal movement on opposing sides of an opening 166 defined by the first sidewall 150. The opening 166 may be sized to provide clearance for the wheel house 72.

The first sidewall 150 may move between a retracted position (shown in FIG. 8) to an expanded position (shown in FIG. 9) as facilitated by the first hinge 154 and the second hinge 156. When in the expanded position, the first pivot panel 160 and the second pivot panel 162 may pivot to close the opening 166. It is contemplated that another sidewall may be mounted on an opposing side of the truck box 14 to move between retracted and expanded positions.

Figure 9A:
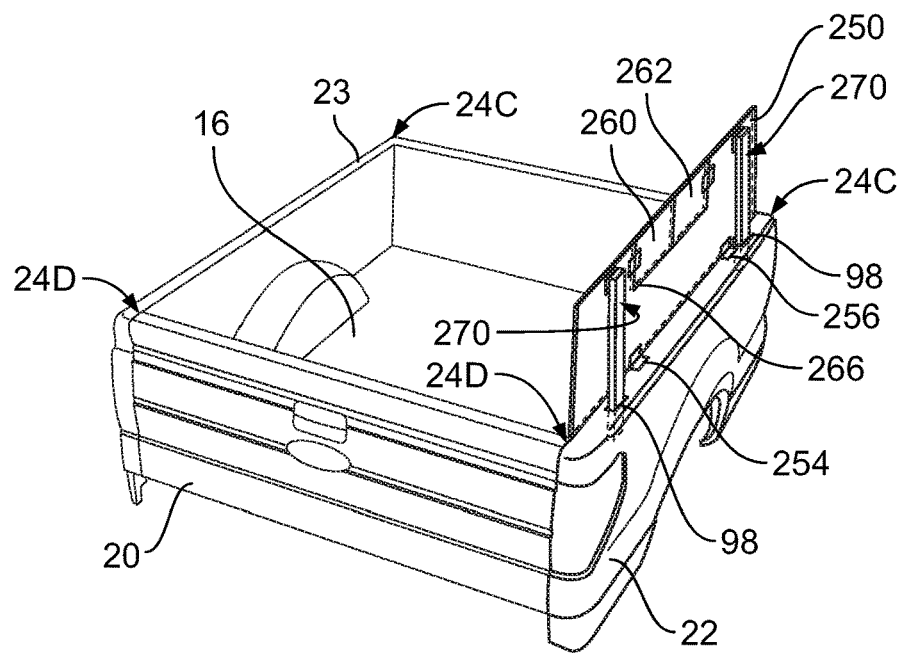
FIG. 9A is a rear perspective view of an example of a portion of an expansion assembly shown mounted to a pickup truck box.
Figure 9B:
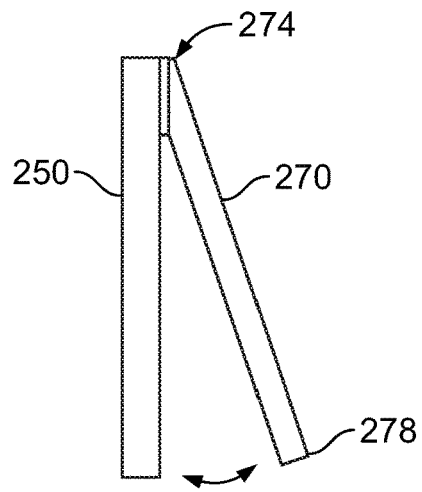
FIG. 9B is a side view of an example of a portion of the expansion assembly of FIG. 9A.

FIGS. 9A and 9B illustrate another example of a sidewall and mount assembly to assist in expanding a cargo volume of the truck box 14. In this example, a first sidewall 250 is mounted to the truck box 14 via a first hinge 254 and a second hinge 256. While shown as two separate hinges, it is contemplated that an embodiment in which a single hinge extends along an edge of the truck box 14 to mount the first sidewall 250 to the truck box 14 is within a scope of this disclosure. The first sidewall 250 may include a first door 260 and a second door 262. Each of the first door 260 and the second door 262 may be mounted for pivotal movement on opposing sides of an opening 266 defined by the first sidewall 250.

FIG. 9B shows further detail of one of a pair of support members 270 to assist in structurally reinforcing the first sidewall 250 when in the raised position or the expanded position. For example, a hinge may be included at an attachment region 274 so the support member 270 may pivot relative to the first sidewall 250. A lower end 278 of the support member may be sized for disposal within one of the stake pocket holes 98.

Alternatively, each of the pair of support members 270 may be removable. For example, the support member 70 may be removably attachable to the first sidewall 250 at the attachment region 274 so the support member 70 may be stowed separately when the first sidewall is in the lowered position or does not need additional structural support.

Figure 10:
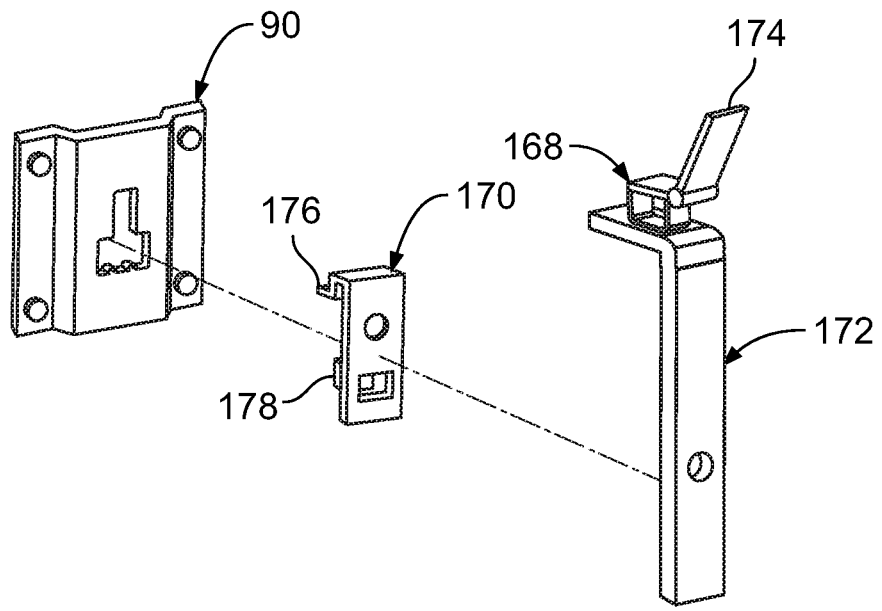
FIG. 10 is an exploded perspective view of another example of a portion of a mount assembly for a sidewall of the expansion assembly of FIG. 2.
Figure 11:
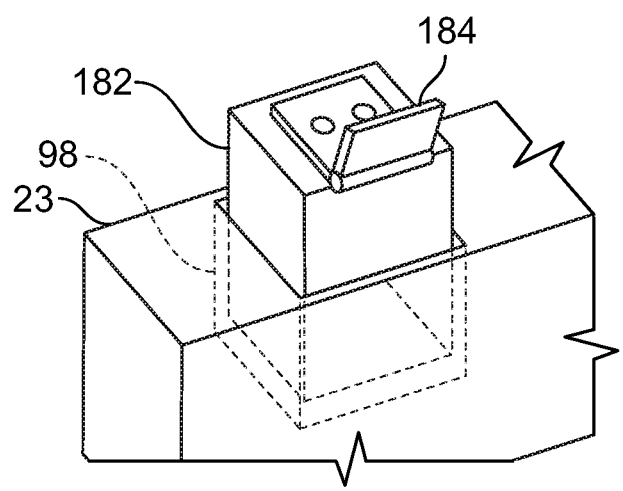
FIG. 11 is a fragmentary perspective view of yet another example of a portion of a mount assembly for a sidewall of the expansion assembly of FIG. 2.

FIGS. 10 and 11 illustrate other examples of an assembly to facilitate hinged movement of the first sidewall 150 and the first sidewall 250. In FIG. 10, a hinge assembly 168 includes a first bracket 170, a second bracket 172, and a hinge member 174. Similar to the SIP clip 104 as described above, the first bracket 170 may include an overhang 176 and a SIP pin 178 to facilitate securement of the second bracket 172 to the SIP bracket 90. The hinge member 174 may be mounted to the second bracket 172. A sidewall (not shown in FIG. 10) may be secured to the hinge member 174 for hinged movement between a retracted and an expanded position.

In FIG. 11, a hinge assembly 180 includes a mount post 182 and a hinge member 184. The mount post 182 is adapted to be inserted into the stake pocket hole 98. The hinge member 184 may be attached to the mount post 182. A sidewall (not shown in FIG. 11) may be secured to the hinge member 184 for hinged movement between a retracted and an expanded position.

Figure 12:
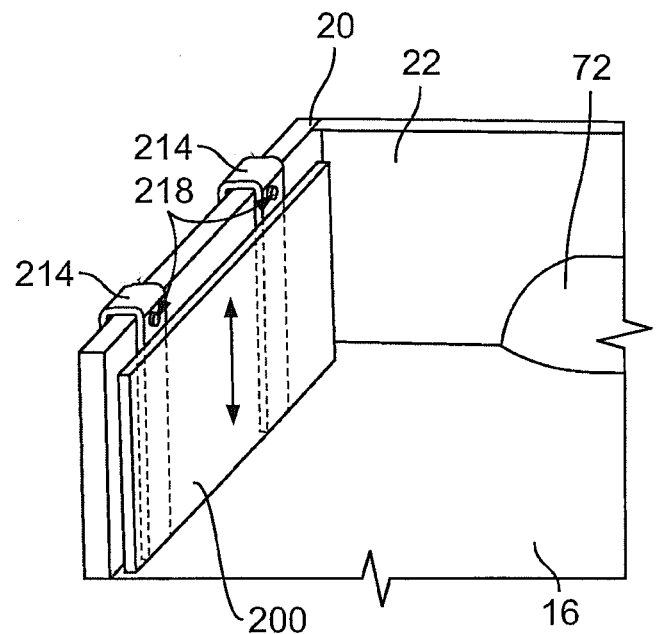
FIG. 12 is a fragmentary perspective view of a portion of the pickup truck box of FIG. 2 illustrating yet another example of a portion of the expansion assembly of FIG. 2.
Figure 13:
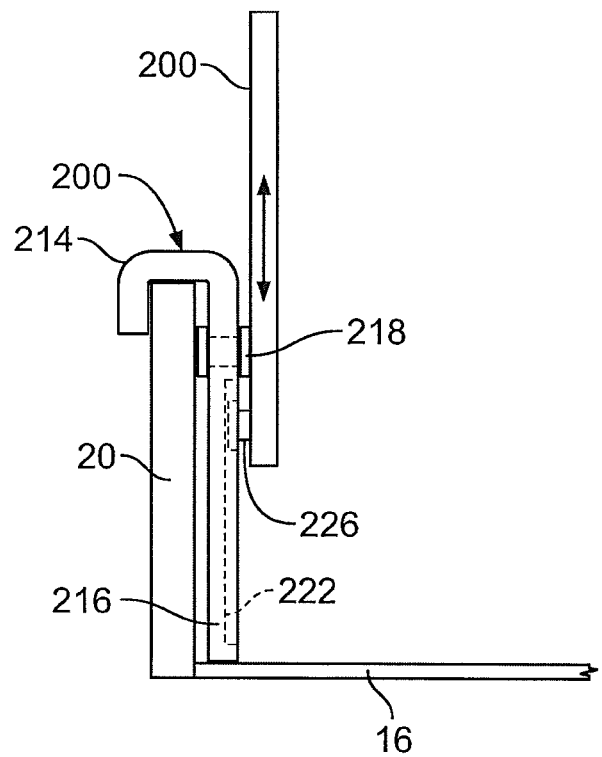
FIG. 13 is a side view of the portion of the expansion assembly of FIG. 12.

FIGS. 12 and 13 illustrate another example of a sidewall and mount assembly to assist in expanding the cargo volume of the truck box 14. In this example, a sidewall 200 may be mounted to the tailgate 20 or the header 18 (not shown). One or more clamp assemblies 210 may mount the sidewall 200 to the truck box 14 and facilitate vertical translation of the sidewall 200 between at least a retracted and an expanded position. While shown as mounting to the tailgate 20, the one or more clamp assemblies 210 may be utilized to mount a sidewall for translation to a header or body sidewall of a pickup truck box. The clamp assembly 210 may include a clamp 214 extending from a body member 216. A fastener assembly 218 may secure the clamp assembly 210 to the tailgate 20. The body member 216 may include a body slot 222 to receive a flange 226 of the sidewall 200 so that the sidewall 200 may move vertically as the flange 226 moves within the body slot 222.

Figure 14:
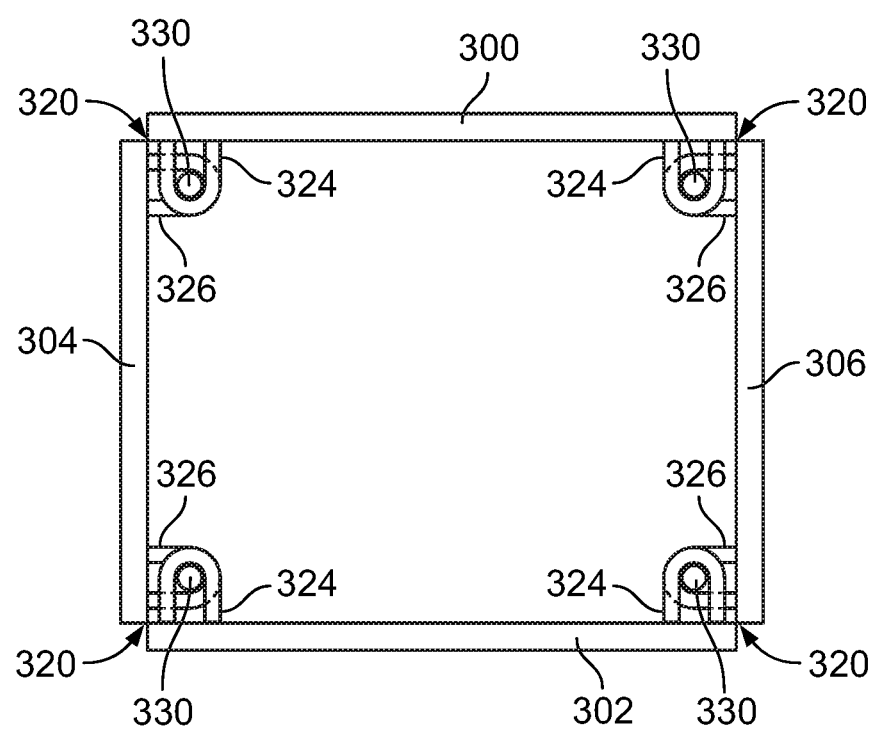
FIG. 14 is a top plan view of a portion of an expansion assembly for a pickup truck box illustrating an example of reinforcement members to assist in supporting sidewalls of the expansion assembly.

FIG. 14 is a top plan view of a portion of an expansion assembly for a pickup truck box illustrating an example of reinforcement members to assist in supporting sidewalls of the expansion assembly. A first sidewall 300, a second sidewall 302, a rear sidewall 304, and a forward sidewall 306 are shown arranged with one another to define a square or rectangle shape. A lock mechanism 320 is shown at each corner between adjacent sidewalls. Each lock mechanism may include a first loop 324, a second loop 326, and a pin 330 securing the loops to one another. For example, when the first sidewall 300 and the rear sidewall 304 are in a raised position, the first loop 324 of the first sidewall 300 may extend over the second loop 326 of the rear sidewall 304 to define a through-hole sized to receive the pin 330 to provide additional structural reinforcement to the first sidewall 300 and the rear sidewall 304.

A combination of the examples of assemblies described above provides an option to selectively increase cargo volume of a pickup truck when the sidewalls, rear sidewall, and forward sidewall are oriented in expanded positions.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A truck box assembly comprising:
   a sidewall defining an opening to provide clearance for a wheel house;
   a pair of doors each extending from one side of the opening; and
   a support assembly mounted to a truck box supports the sidewall as the sidewall moves between retracted and expanded positions,
   wherein each of the doors is moveable between an open position and a closed position filling the opening in the expanded position.

2. The assembly of claim 1, wherein the support assembly includes a first mount post positioned rearward of the wheel house and a second mount post positioned forward of the wheel house, and wherein the sidewall is mounted to each of the first mount post and the second mount post for vertical translation.

3. The assembly of claim 1, wherein the support assembly includes a mount post secured to the truck box at a standard interface plate (SIP) bracket and a horizontal member extending from the mount post and secured to the truck box at a stake pocket hole.

4. The assembly of claim 3, wherein the support assembly further includes a fastener assembly having an overhang for hooking over the SIP bracket and a pin extending from the horizontal member sized for insertion within the stake pocket hole.

5. The assembly of claim 1, further comprising:
   a second support assembly mounted to the truck box and supporting a second sidewall for vertical translation between a second retracted position and a second expanded position;

a rear support assembly mounted to a tailgate of the truck box and supporting a rear sidewall for vertical translation between a third retracted position and a third expanded position; and a forward support assembly mounted to a header of the truck box and supporting a forward sidewall for vertical translation between a fourth retracted position and a fourth expanded position, wherein the sidewalls define a square-shaped wall extending from an upper portion of the truck box when vertically translated to respective expanded positions to increase a cargo volume of the truck box.

6. The assembly of claim 1, further comprising a rear support assembly having a clamp extending from a body member, wherein the clamp is sized for grasping an upper portion of a tailgate or header and the body member includes a slot sized to receive a flange of a rear sidewall or forward sidewall to facilitate vertical translation along the body member.

7. The assembly of claim 1, wherein the support assembly includes a translation post sized for vertical translation within a mount post for securing to a SIP bracket, and wherein the sidewall is secured to the translation post to move between the retracted and expanded positions.

8. A pickup truck box expansion assembly comprising:
a support assembly including a vertical member having a fastener assembly for securing to a standard interface plate (SIP) bracket of a truck box, a horizontal member extending rearward from an upper portion of the vertical member and having a pin for securing within a stake pocket hole of the truck box, and a translation assembly mounted to the vertical member for translation between a retracted and an expanded position;
a sidewall mounted to the translation assembly and including a cutout sized for providing clearance to a wheel house when the translation assembly is in the retracted position; and
a pair of doors each mounted to one of two opposing sides of the cutout to horizontally pivot and fill the cutout when the translation assembly is in the expanded position.

9. The assembly of claim 8, wherein the SIP bracket is located rearward of the wheel house and adjacent the stake pocket hole.

10. The assembly of claim 8, wherein the SIP bracket includes a raised portion spaced from an inner surface of the truck box, and wherein the fastener assembly includes an overhang sized for disposal between the raised portion and the inner surface to mount the vertical member to the SIP bracket.

11. The assembly of claim 8, wherein the SIP bracket includes a SIP slot, and wherein the fastener assembly includes a SIP pin sized for insertion within the SIP slot to mount the vertical member to the SIP bracket.

12. The assembly of claim 8 further comprising a rear support assembly including a clamp extending from a body member, wherein the clamp is sized for grasping an upper portion of a tailgate or header of the truck box and the body member includes a slot sized to receive a flange of a rear sidewall or a forward sidewall to facilitate vertical translation along the body member.

13. The assembly of claim 8 further comprising:
a second sidewall mounted to a second translation assembly and including a second cutout sized for providing clearance to a second wheel house when the second translation assembly is in a second retracted position;
a second pair of doors each mounted to one of each side of the second cutout to horizontally pivot and fill the second cutout when the second translation assembly is in a second expanded position;
a rear sidewall mounted to a tailgate of the truck box for vertical translation between a third retracted position and a third expanded position; and
a forward sidewall mounted to a header of the truck box for vertical translation between a fourth retracted position and a fourth expanded position,
wherein the sidewalls are arranged with one another when oriented in respective expanded positions to define an expanded cavity having a volume greater than a volume of a truck box cavity when the sidewalls are oriented in respective retracted positions.

14. The assembly of claim 13 further comprising a lock mechanism at one or more of corners between adjacent sidewalls, wherein one of the adjacent sidewalls includes a first loop overlapping a second loop of the other of the adjacent sidewalls, and wherein the lock mechanism further includes a pin for disposal within the first loop and the second loop to structurally reinforce the sidewalls when oriented in a respective raised position.

15. A pickup truck box assembly comprising:
a truck box including a first body sidewall, a second body sidewall, a tailgate, and a header; and
an expansion assembly moveable between a lowered position and a raised position, wherein the expansion assembly includes a first sidewall mounted to the first body sidewall, a second sidewall mounted to the second body sidewall, a rear sidewall mounted to the tailgate, and a forward sidewall mounted to the header,
wherein the sidewalls are arranged with one another to define a first cargo volume of the truck box when oriented in respective lowered positions and a second cargo volume greater than the first cargo volume when the sidewalls are oriented in respective raised positions.

16. The assembly of claim 15, further comprising a pair of support assemblies each to support one of the first body sidewall and the second body sidewall, each of the pair of support assemblies comprising:
a vertical member having a fastener assembly to secure the vertical member to a standard interface plate (SIP) bracket of the truck box and having a slot to receive a translation flange of the respective sidewall to facilitate vertical translation of the respective sidewall; and
a horizontal member extending from an upper portion of the vertical member to secure to a stake pocket hole of the truck box.

17. The assembly of claim 16, wherein the SIP bracket includes a raised portion spaced from a surface of a respective body sidewall of the truck box, and wherein the fastener assembly includes an overhang sized for disposal between the raised portion and the surface to secure the vertical member to the SIP bracket.

18. The assembly of claim 15 further comprising:
a first hinge disposed between the first sidewall and the first body sidewall to facilitate pivoting of the first sidewall between the lowered position and the raised position; and
a second hinge disposed between the second sidewall and the second body sidewall to facilitate pivoting the second sidewall between the lowered position and the raised position.

19. The assembly of claim 18 further comprising a support member secured to one of the first sidewall and the second sidewall at a first end and including a second end sized for disposal within a stake pocket hole of one of the first sidewall and the second sidewall.

20. The assembly of claim 15 further comprising a lock mechanism at each corner between adjacent sidewalls including a first loop overlapping a second loop and a pin for disposal within the first loop and the second loop to structurally reinforce the sidewalls when oriented in the raised position.

\* \* \* \* \*